UNITED STATES PATENT OFFICE.

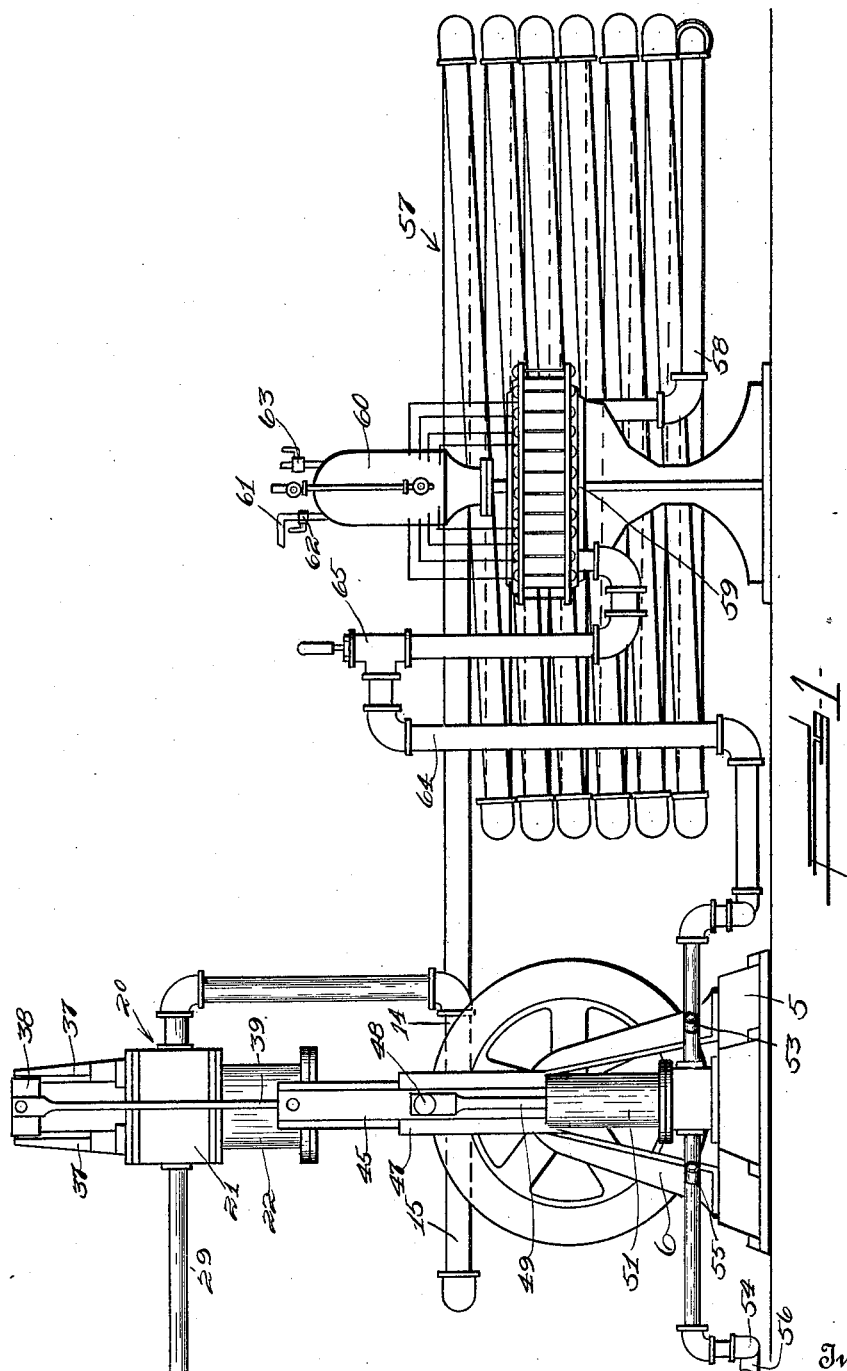

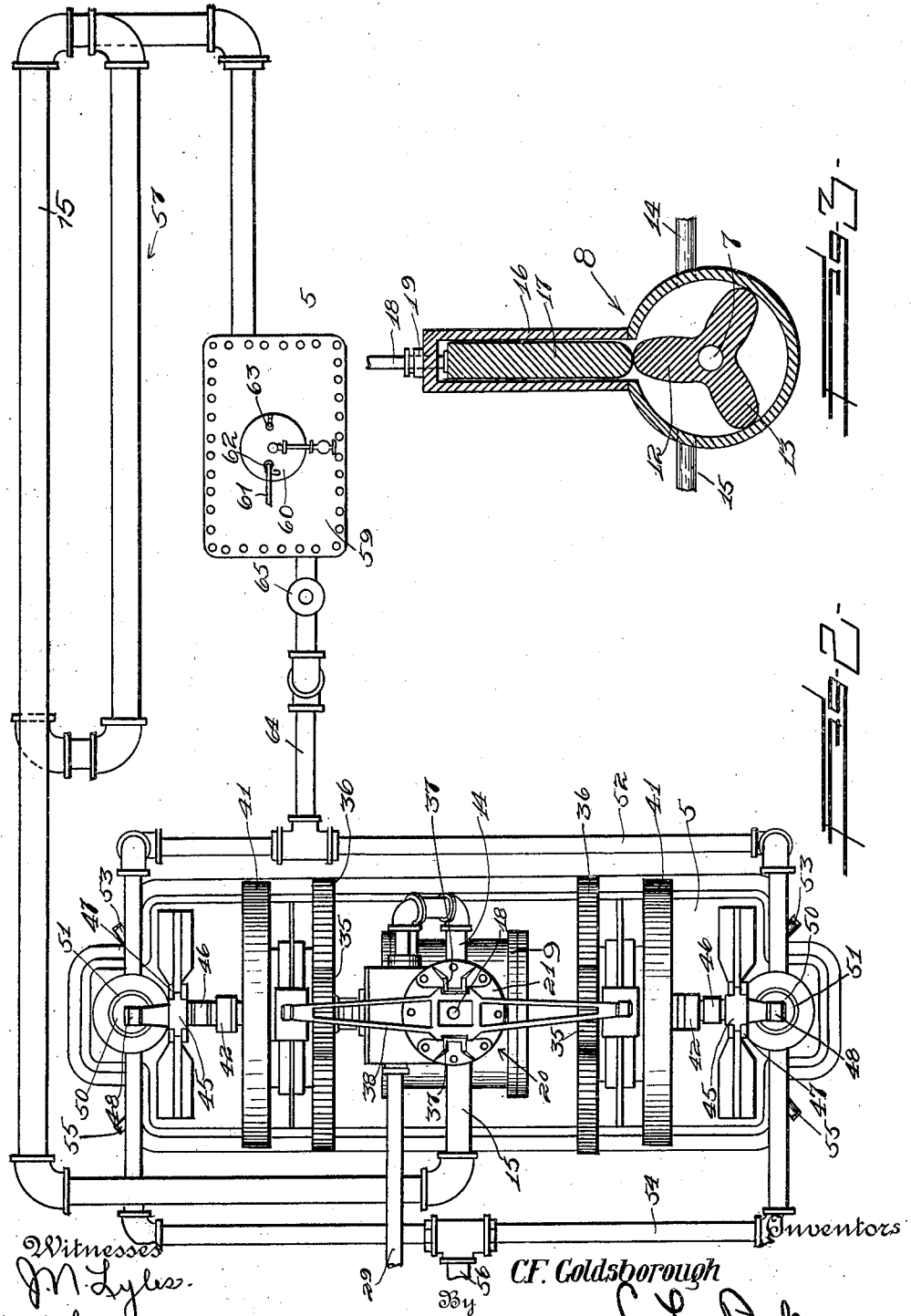

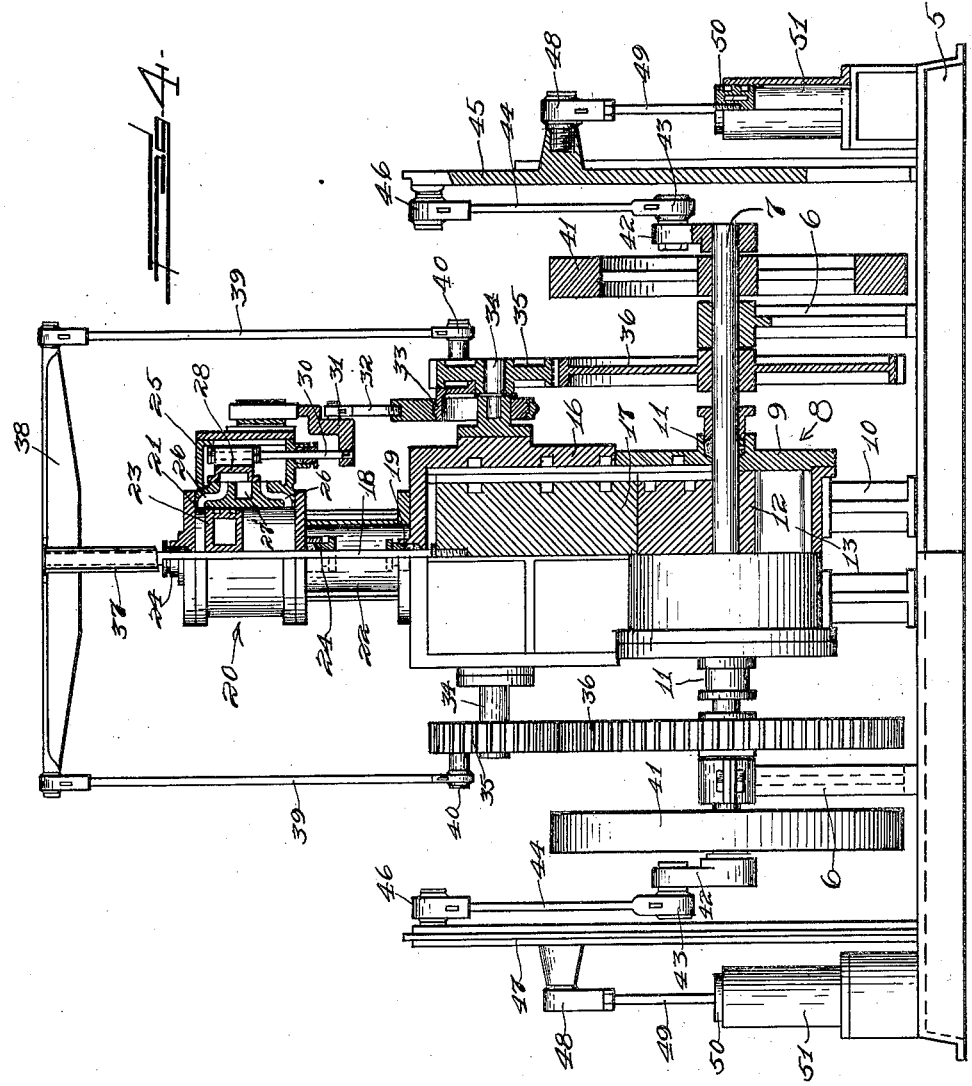

CHARLES FRANKLIN GOLDSBOROUGH, OF MONETT, MISSOURI, ASSIGNOR, BY DIRECT AND MESNE ASSIGNMENTS, TO PEERLESS VACUUM ENGINE COMPANY, OF PHOENIX, ARIZONA, A CORPORATION OF ARIZONA.

POWER PLANT.

1,092,257.     Specification of Letters Patent.     Patented Apr. 7, 1914.

Application filed April 14, 1913. Serial No. 760,966.

*To all whom it may concern:*

Be it known that I, CHARLES FRANKLIN GOLDSBOROUGH, a citizen of the United States, residing at Monett, in the county of Barry and State of Missouri, have invented certain new and useful Improvements in Power Plants, of which the following is a specification.

This invention relates to a steam or compressed air operated system, wherein a reciprocatory engine is geared or connected with a rotary engine, which operate together economically in the production of power.

An important object of this invention is to provide means of the above mentioned character, which will produce the maximum power from the consumption of a given amount of fuel and will also be economical in the consumption of water.

A further object of my invention is to provide a steam or compressed air operated apparatus, embodying a reciprocatory engine and rotary engine, so connected that they operate together in the production of power with the reciprocatory engine operating the movable abutment of the rotary engine.

Other objects and advantages of this invention will be apparent during the course of the following description.

In the accompanying drawings, forming a part of this specification and in which like numerals are employed to designate like parts throughout the same, Figure 1 is a side view of the complete system, Fig. 2 is a plan view of the same, Fig. 3 is a central vertical sectional view through the turbine or rotary engine, and, Fig. 4 is a front view of the complete compound engine, half thereof being shown in central vertical section.

In the drawings, wherein for the purpose of illustration, I have shown a preferred embodiment of the invention, the numeral 5, (see Fig. 4), designates a foundation or base, upon which is rigidly mounted upstanding bearings 6, through which is journaled a horizontal rotatable shaft 7. Disposed between the fixed bearings 6 is a rotary engine 8, comprising a shell 9, rigidly mounted upon fixed standards or supports 10, as shown. The shaft 7 passes through the shell 9, as shown, there being suitable stuffing boxes 11 to prevent the escape of steam or the like.

Rigidly mounted upon the shaft 7 is a rotor 12, disposed within the shell 9, as shown. As more clearly shown in Fig. 3, the rotor 12 has three arms 13.

The numeral 14 designates the rotary engine inlet pipe and the numeral 15 the exhaust pipe of the same.

Formed upon or suitably connected with the rotary engine shell 9 is an upstanding abutment shell 16, having its upper end closed and its lower end open, as shown. Disposed to reciprocate within the abutment shell 16 is an abutment 17, to engage the rotor 12, as shown. This reciprocatory abutment 17 is connected with and moved by an upwardly extending piston rod 18, operating through a stuffing box 19, as shown.

Disposed above the rotary engine 8 is a reciprocatory engine 20, including a stationary cylinder or shell 21, which is connected with a cylinder or support 22, having connection with the abutment shell 16. Mounted to reciprocate within the stationary cylinder 21 is a piston 23, connected with the upstanding piston rod 18, which operates through stuffing boxes 24, as shown. Connected with one side of the stationary cylinder 21 is a steam chest 25 provided with inlet ports 26, leading into the opposite ends of the cylinder 21. This steam chest is further provided with an exhaust port, 27, which discharges into the pipe 14. A slide valve 28 is mounted within the steam chest 25, to control the passage of steam through the ports 26 and 27, as is customary. The steam chest 25 is provided with an inlet port 27', as shown, receiving steam from a supply pipe 29, shown in Figs. 1 and 2. The valve 28 is shifted by a stem 30, having connection with a slide 31. This slide is operated by a pitman 32, which in turn is operated by a cam 33.

Disposed upon opposite sides of the abutment shell 16, are horizontal stub-shafts 34, rigidly connected therewith. These stub-shafts have small gear wheels or pinions 35 rotatably mounted thereon. The cam 33 is rigidly connected with the adjacent pinion 35, for rotation therewith. The small pinions or gear wheels 35 engage large gear wheels 36, which are disposed upon opposite sides of the rotary engine shell or cylinder 9 and are rigidly mounted upon the shaft 7. The gear wheels 36 are three times as large in diameter as the gear wheels 35.

Rigidly mounted with the upper end of the cylinder 21 are upstanding guides 37, between which operates a cross-head 38. Pivotally connected with the outer ends of this cross-head are depending pitmen 39, the lower ends of which are pivotally connected with the small gear wheels 35, as shown at 40.

Rigidly mounted upon the outer portions of the shaft 7 are fly wheels 41, having cranks 42 disposed outwardly of and adjacent the same, such cranks being rigidly connected with the ends of the shaft 7. The cranks 42 are pivotally connected, as shown at 43, with outwardly extending pitmen 44, having pivotal connection with slides or carriages 45, as shown at 46. These slides or carriages operate within upstanding stationary guides 47, as shown. Suitably pivotally connected with the slides or carriages 45, as shown at 48, are depending rods 49, having connection with plungers 50, operating within upstanding pump cylinders 51.

As more clearly shown in Fig. 2, the pump cylinders 51 have connection with a common inlet pipe 52, to supply water to the pump cylinders upon the up-stroke of the plungers 50, the same being provided with check valves 53, to prevent the back flow of the water. Connected with the opposite sides of the pump cylinders 51 is a common outlet pipe 54, through which the water passes upon the down-stroke of the plungers 50. This outlet pipe 54 is provided with check valves 55 to prevent the back flow of the water. The outlet pipe 54 has connection with a pipe 56, which leads to the boilers.

The numeral 57 designates a pressure steam condenser, connected with the turbine exhaust pipe 15. This steam condenser is in the form of a coiled pipe, the lower end 58 of which leads into the lower portion of an upstanding oil separator 59, of any well known or preferred type. Connected with the upper end of this oil separator is a dome 60, within which the oil passes, upon being separated from the water. Extending into the dome 60 is an oil draw-off pipe 61, provided with a manually operated valve 62, to control the volume of oil passing through the pipe 61. This pipe 61 may be connected with an oil force feed system (not shown), which distributes the oil to different parts of the machinery, as is desired. The dome 60 is provided with a pressure control valve 63, which may be set to maintain a constant pressure within the dome 60, at a desired degree.

Connected with the lower end of the oil separator 59 is a water outlet pipe 64, connected with the pump inlet pipe 52, as shown. The pipe 64 is provided with an upstanding portion, having a pressure relief valve 65 connected therewith. This pressure relief valve 65 is adapted to be set so that it will maintain a constant pressure at a desired degree, within the condenser 57. If the pressure rises in the condenser 57 above a desired degree the valve 65 will automatically blow off. It is desired to maintain the pressure constant at a predetermined degree within the condenser 57, as it is well known that steam will more readily condense when subjected to a certain degree of pressure. This pressure however may not be sufficient to perceptibly interfere with the exhaust of the steam from the turbine.

The operation of the system is as follows:—The steam is being constantly fed from the boiler or boilers through the supply pipe 29, whereby such steam is fed to the cylinder 21, to cause the piston 23 therein to reciprocate. This movement of the piston 23 reciprocates the pitmen 39, which in turn rotate the small gear wheels 35. These small gear wheels rotate the large gear wheels 36. As the steam is exhausted through the exhaust port of the reciprocatory engine, the same passes through the rotary engine inlet pipe 14, and impinges against the rotor 12, to revolve the same. The steam passes from the shell 9 of the turbine through exhaust pipe 15 thereof. As above stated the small gear wheels 30 have only one-third the diameter of the large gear wheels 36, whereby they will rotate three times as fast as the large gear wheels. The cross head 38 moves up and down upon the completion of a revolution by the small gear wheels 35. The abutment 17 is moved up and down with the cross head, to clear the arms 13 of the rotor 12. It is thus seen that by providing means for reciprocating the abutment 17, this work is taken off of the rotor 12, whereby the engaging surfaces of the rotor and the pitman 17 will not be subjected to excessive friction. The steam which is exhausted from the turbine into the pipe 15, passes into the pressure steam condenser 57, and is there converted into water which is fed into the oil separator 59. The oil carried over by the steam, will now rise to the top of the water in the separator 59 and collect within the dome 60. This oil is again supplied to desired portions of the machinery. The pressure control valve 65 opens upon the increase of the pressure within the condenser 57 above a desired degree, whereby the pumps including the cylinders 51 will draw the water through the pipe 64 and pipe 52 and discharge the same into pipe 54, from which it passes to the steam boiler or boilers (not shown).

It is to be understood that the form of my invention herewith shown and described is to be taken as a preferred example of the same, and that certain changes in the shape, size and arrangement of parts may be resorted to without departing from the spirit of the invention or the scope of the subjoined claims.

Having described my invention, I claim:—

1. In a system of the character described, the combination with a reciprocatory engine including a piston, of a rotary engine including a rotor and a movable abutment, means connecting the piston and movable abutment, means for supplying a motive fluid to the reciprocatory engine, and means for supplying the exhaust of the reciprocatory engine to the rotary engine.

2. In a system of the character described, the combination with a reciprocatory engine including a piston, of a rotary engine including a rotor and a reciprocatory abutment, a rod connecting the piston and the abutment, driving connecting means between the piston and rotor, means for supplying a motive fluid to the reciprocatory engine, and means for supplying the exhaust from the reciprocatory engine to the rotary engine.

3. In a system of the character described, the combination with a reciprocatory engine including a piston, of a rotary engine including a rotor and a reciprocatory abutment, a rod connecting the piston and the abutment, gear wheels disposed upon opposite sides of the rotor and connected with the same for rotation therewith, smaller gear wheels engaging the first named gear wheels, a cross head connected with the piston for movement therewith, pitmen connecting the cross head with the smaller gear wheels, means for supplying a motive fluid to the reciprocatory engine, and means for supplying the exhaust from the reciprocatory engine to the rotary engine.

4. In a system of the character described, the combination with a reciprocatory engine including a piston, of a rotary engine including a rotor and a movable abutment, a gear wheel connected with the rotor for rotation therewith, a second gear wheel engaging the first named gear wheel, a cross head connected with the piston, a pitman connecting the cross head and second gear wheel, means for supplying a motive fluid to the reciprocatory engine, and means for supplying the exhaust from the reciprocatory engine to the rotary engine.

5. In a system of the character described, an upstanding reciprocatory engine including a piston, a rotary engine disposed below the same and including a rotor and movable abutment, gear wheels disposed upon opposite sides of the rotor and connected with the same for rotation therewith, second gear wheels engaging the first named gear wheel, an upstanding rod connected with the piston, a transverse cross head connected with the upstanding rod, pitmen connecting the cross head with the second gear wheels, means for supplying a motive fluid to the reciprocatory engine, and means for supplying the exhaust from the reciprocatory engine to the rotary engine.

In testimony whereof I affix my signature in presence of two witnesses.

CHARLES FRANKLIN GOLDSBOROUGH.

Witnesses:
   FIELDING S. SIZER,
   C. W. COPELAND.

---

Copies of this patent may be obtained for five cents each, by addressing the "Commissioner of Patents, Washington, D. C."